US012707368B2

(12) United States Patent
Liu

(10) Patent No.: US 12,707,368 B2
(45) Date of Patent: Aug. 11, 2026

(54) SIGNAL FORWARDING METHOD, RELAY DEVICE, AND COMMUNICATION SYSTEM

(71) Applicant: HUAWEI TECHNOLOGIES CO., LTD., Shenzhen (CN)

(72) Inventor: Fengwei Liu, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 239 days.

(21) Appl. No.: 18/487,947

(22) Filed: Oct. 16, 2023

(65) Prior Publication Data

US 2024/0040467 A1 Feb. 1, 2024

Related U.S. Application Data

(63) Continuation of application No. PCT/CN2022/085862, filed on Apr. 8, 2022.

(30) Foreign Application Priority Data

Apr. 16, 2021 (CN) ......................... 202110414015.2

(51) Int. Cl.
*H04W 4/00* (2018.01)
*H04W 28/02* (2009.01)
(Continued)

(52) U.S. Cl.
CPC ....... *H04W 40/04* (2013.01); *H04W 28/0215* (2013.01); *H04W 40/12* (2013.01)

(58) Field of Classification Search
CPC .. H04W 40/04; H04W 28/0215; H04W 40/12
See application file for complete search history.

(56) References Cited

U.S. PATENT DOCUMENTS

2010/0190459 A1* 7/2010 Li ....................... H04W 52/383 455/234.1
2010/0265839 A1* 10/2010 Almgren ............ H04B 7/15535 370/252

(Continued)

FOREIGN PATENT DOCUMENTS

EP 3764704 A1 1/2021
KR 20140046707 A 4/2014

*Primary Examiner* — Abdelnabi O Musa

(57) ABSTRACT

Embodiments of this application provide a signal forwarding method, a relay device, and a communication system, and relate to the field of communication technologies. The relay device determines a first time domain resource based on first resource information; and determines a first forwarding gain corresponding to the first resource information based on an association relationship between a forwarding gain and resource information, where the resource information includes one or more of the following: signal information, channel information, a time domain resource number, back-haul beam information, and access beam information; and forwards a received signal on the first time domain resource by using the first forwarding gain. In this application, the relay device forwards, based on forwarding gains corresponding to different resource information, a signal received on the first time domain resource. A coverage enhancement capability of the relay device can be improved in this manner.

20 Claims, 4 Drawing Sheets

(51) Int. Cl.
*H04W 40/04* (2009.01)
*H04W 40/12* (2009.01)

(56) References Cited

U.S. PATENT DOCUMENTS

| | | | | |
|---|---|---|---|---|
| 2012/0314647 | A1* | 12/2012 | Gore | H04B 7/15542 370/315 |
| 2013/0078907 | A1* | 3/2013 | Gore | H04B 7/15535 455/7 |
| 2015/0304964 | A1* | 10/2015 | Larsson | H04W 52/40 455/522 |
| 2017/0041421 | A1* | 2/2017 | Liu | H04L 67/5682 |

* cited by examiner

SIGNAL FORWARDING METHOD, RELAY DEVICE, AND COMMUNICATION SYSTEM

CROSS-REFERENCE TO RELATED APPLICATIONS

This application is a continuation of International Application No. PCT/CN2022/085862, filed on Apr. 8, 2022, which claims priority to Chinese Patent Application No. 202110414015.2, filed on Apr. 16, 2021. The disclosures of the aforementioned applications are hereby incorporated by reference in their entireties.

TECHNICAL FIELD

Embodiments of this application relate to the field of communication technologies, and in particular, to a signal forwarding method, a relay device, and a communication system.

BACKGROUND

In a wireless communication system, when a network device and a terminal device transmit data with each other, a transmission bandwidth may be increased to meet a transmission rate requirement of a user. To obtain a larger transmission bandwidth, the wireless communication system may use a spectrum resource of a higher frequency band. Although a high frequency band can provide abundant spectrum resources, a high frequency electromagnetic wave has disadvantages such as large propagation attenuation and a weak diffraction capability. Therefore, it is difficult for a cellular communication system deployed at a high frequency band to implement full coverage of an area.

To resolve the coverage problem of the high frequency band in the wireless communication system, a relay device is introduced, to amplify and forward a transmission signal between the network device and the terminal device. It should be noted that the relay device amplifies interference noise while amplifying an uplink signal sent by the terminal device. Generally, a power of the uplink signal received by the relay device is low. If an amplification gain of the relay device is large, an amplified noise power is accordingly large, and receiving performance of the network device is prone to be affected (for another terminal device). If the amplification gain of the relay device is small, the uplink signal is insufficiently amplified. As a result, the network device cannot sufficiently receive a to-be-forwarded uplink signal of the terminal device.

SUMMARY

This application provides a signal forwarding method, a relay device, and a communication system, to improve uplink forwarding performance of the relay device.

According to a first aspect, this application provides a signal forwarding method. The method may be applied to a relay device. The relay device is also referred to as a relay node. When performing the method in this application, the relay device may determine a first time domain resource based on first resource information; determine a first forwarding gain corresponding to the first resource information based on an association relationship between a forwarding gain and resource information, where the resource information includes one or more of the following: signal information, channel information, a time domain resource number, backhaul beam information, and access beam information; and forward a received signal on the first time domain resource by using the first forwarding gain.

It should be noted that the first resource information may be one or more of the foregoing resource information, and the first time domain resource may be a slot, a symbol, a time division duplex (TDD) configuration periodicity, a subframe, or the like. The first resource information may include an identifier of a time domain resource or a time unit, for example, a slot number or a symbol number. The first resource information may further include signal or channel information, for example, sounding reference signal (SRS) signal information, physical random access channel (PRACH) channel information, or physical uplink control channel (PUCCH) channel information. The relay device may determine, based on broadcast or unicast signaling sent by a network device or a donor base station, time domain resources corresponding to each channel or each signal (namely, the first resource information). For example, the relay device determines, by reading broadcast information (for example, system information block (SIB) information), a time domain resource occupied by a PRACH channel (the first resource information is equivalent to the PRACH channel information), or the relay device determines, by reading unicast information (for example, radio resource control (RRC) information), a time domain resource occupied by an SRS signal (the first resource information is equivalent to the SRS signal information).

The association relationship between the forwarding gain and the resource information may be preconfigured by the donor base station, sent to the relay device, and stored by the relay device; or may be sent to the relay device after the donor base station receives a piece of indication information.

In addition, as a location of a terminal device continuously changes or resource information occupied by a sent signal changes, forwarding gain information preconfigured by the donor base station may not be applicable in real time, and the donor base station may update forwarding gain configuration information after sending the forwarding gain configuration information, and send updated forwarding gain configuration information to the relay device. Alternatively, when it is determined that attribute information (a location, a resource occupied by a signal, or the like) of a terminal device changes, forwarding gain configuration information may be updated in time, and updated forwarding gain configuration information may be sent to the relay device. In addition, a configuration rule of the forwarding gain information may further include another type. Details are not described herein. All the foregoing several configuration rules or a combination of the foregoing several configuration rules are applicable to this application.

It should also be noted that there is an association relationship between the forwarding gain configuration information and the resource information (the signal information, the channel information, the time domain resource number, the backhaul beam information, the access beam information, and the like), that is, different resource information or different resource information sets may correspond to same or different forwarding gain values.

In addition, the received signal may come from the donor base station or the terminal device. A signal from the donor base station may be understood as a downlink signal. After receiving the downlink signal, the relay device may forward the downlink signal to the terminal device based on the forwarding gain. A signal from the terminal device may be understood as an uplink signal. After receiving the uplink signal, the relay device may forward the uplink signal to the donor base station based on the forwarding gain. In addition, when the relay device does not receive the uplink signal or the downlink signal, the received signal may be only a noise signal. In this case, the relay device forwards the noise signal based on the forwarding gain.

In this application, the relay device forwards the received signal based on forwarding gains corresponding to different resource information configurations, so that a coverage enhancement capability of the relay device can be improved. For example, when scheduling a near-end user, the donor base station indicates the relay device to forward the received signal by using a low forwarding gain, to avoid interference caused by amplified noise; and when receiving a common channel (for example, the PRACH), the donor base station indicates the relay device to forward the received signal by using a moderate forwarding gain, to balance access success rates of a directly connected user and a non-directly connected user.

In an optional implementation, the method includes: receiving forwarding gain configuration information from the donor base station. The forwarding gain configuration information includes the association relationship between the forwarding gain and the resource information.

In an optional implementation, different resource information corresponds to different forwarding gains.

In this application, relationships between different resource information and forwarding gains are configured to indicate the relay device to perform a forwarding operation, so that forwarding performance of the relay device can be improved.

In an optional implementation, the forwarding gain is an absolute gain or an offset relative to a reference gain. The reference gain is one of the following information: a downlink forwarding gain or a preset gain.

It should be noted that if being an absolute gain value, the forwarding gain may be a gain value of an amplification circuit, and the forwarding gain may be an uplink forwarding gain or may be a downlink forwarding gain. Only the uplink forwarding gain is used as an example for illustration herein. For example, uplink forwarding gain information is 10 dB, that is, the gain value of the amplification circuit is 10 dB. If being a relative gain value, the forwarding gain may be an offset value (unit: decibel dB or linear multiple) relative to the reference gain. For example, if an uplink forwarding gain is 5 dB and the reference gain is 30 dB, an actual uplink forwarding gain is 35 dB (30+5 dB). If the uplink forwarding gain is a relative gain value, the reference gain may be configured based on the downlink forwarding gain. For example, if the downlink forwarding gain is 20 dB, the reference gain may be set to 20 dB. Alternatively, the reference gain may be set based on a value predefined by the donor base station. For example, if the predefined value is 30 dB, the reference gain is set to 30 dB.

In an optional implementation, the forwarding gain configuration information may be indicated by semi-static signaling.

It should be noted that the forwarding gain configuration information indicated by the donor base station by the semi-static signaling may be stored in the relay device. The semi-static signaling may be RRC signaling, or may be another signaling. This is not limited in this application.

In an optional implementation, the forwarding gain configuration information may be indicated by dynamic signaling.

It should be noted that the dynamic signaling is more flexible, and can flexibly indicate forwarding gains of different resource information configurations, for example, indicate the forwarding gain corresponding to the resource information by using downlink control information (DCI) or a media access control control element (MAC CE), for example, indicate a forwarding gain of a time domain resource by using the DCI. This is not limited in this application.

In addition, the semi-static signaling may indicate a forwarding gain corresponding to a signal or a channel, and the dynamic signaling may indicate a forwarding gain corresponding to resource information other than the signal or the channel. For example, that a forwarding gain corresponding to a PRACH is X is indicated by the RRC signaling, and that a forwarding gain corresponding to a time domain resource 1 (for example, a slot 3, or a slot 3 to a slot 10) is Y is indicated by using the DCI. The semi-static signaling and the dynamic signaling indicate a forwarding gain corresponding to which resource information is merely described as an example, and is not limited herein.

In an optional implementation, priorities of forwarding gains corresponding to different resource information are different, and a priority of a forwarding gain corresponding to the channel information is higher than a priority of a forwarding gain corresponding to the signal information. For example, a priority of a forwarding gain corresponding to a PRACH is higher than a priority of a forwarding gain corresponding to an SRS.

In an optional implementation, the forwarding gain configuration information includes: first gain configuration information and second gain configuration information. The first gain configuration information is indicated by the semi-static signaling, the second gain configuration information is indicated by the dynamic signaling, and a priority of the first gain configuration information is higher than a priority of the second gain configuration information.

In embodiments of this application, a priority of forwarding gain information indicated by the semi-static signaling is configured to be higher than a priority of forwarding gain information indicated by the dynamic signaling, so that accurate forwarding of a semi-static signal can be ensured. It should be noted that generally, forwarding of the semi-static signal is more important, and quality thereof needs to be ensured during uplink forwarding. Therefore, the priority of the forwarding gain information indicated by the semi-static signaling is higher than the priority of the forwarding gain information indicated by the dynamic signaling.

In an optional implementation, the first forwarding gain includes a first gain value and a second gain value; the first gain value is different from the second gain value; the first gain value is determined by using the first gain configuration information; the second gain value is determined by using the second gain configuration information; and the relay device may forward the received signal on the first time domain resource by using the first gain value.

In an optional implementation, the method includes: switching forwarding gains in first one or more time units of a second time domain resource if the first forwarding gain is determined by using the first gain configuration information, and a second forwarding gain is determined by using the second gain configuration information; or switching forwarding gains in last one or more time units of the first time domain resource if the first forwarding gain is determined by using the second gain configuration information, and a second forwarding gain is determined by using the first gain configuration information. The second forwarding gain is a forwarding gain used by the relay device to forward the received signal on the second time domain resource; and the first time domain resource and the second time domain resource are adjacent time domain resources, and the second forwarding gain is different from the first forwarding gain.

It should be noted that the foregoing time units are consecutive time units, and the time units may be subframes, symbols, or the like. This is not limited in this application. For example, the first time domain resource includes a plurality of time units. It is assumed that the time units are symbols, and the first time domain resource includes 14 symbols (0 to 13). When the forwarding gains are switched, switching of the forwarding gains are performed on symbol 11 to symbol 13 (the symbol 11 to symbol 13 may be understood as last plurality of time units) of the first time domain resource. The second time domain resource includes a plurality of time units. It is assumed that the time units are symbols, and the second time domain resource includes 14 symbols (0 to 13). When the forwarding gains are switched, switching of the forwarding gains are performed on symbol 1 to symbol 3 (the symbol 1 to symbol 3 may be understood as first plurality of time units) of the second time domain resource. This application is merely an example for description herein, and is not limited.

In addition, the relay device may determine the second forwarding gain based on second resource information and the association relationship between the forwarding gain and the resource information, so that the relay device may forward the received signal on the second time domain resource by using the second forwarding gain.

In an optional implementation, the relay device may report amplified noise power information to the donor base station, so that the donor base station determines the forwarding gain configuration information based on the amplified noise power information.

In an optional implementation, the relay device may receive indication information from the donor base station. The indication information indicates the relay device to measure the amplified noise power information on a specified resource; and the specified resource includes one or more of the following: a time domain resource, a frequency domain resource, and an access beam; and measure the amplified noise power information on the specified resource.

According to a second aspect, this application provides a relay device, including a transceiver unit and a processing unit.

The processing unit is configured to determine a first forwarding gain corresponding to first resource information based on an association relationship between a forwarding gain and resource information. The resource information includes one or more of the following: signal information, channel information, a time domain resource number, backhaul beam information, and access beam information. The transceiver unit is configured to forward a received signal on a first time domain resource by using the first forwarding gain. The first time domain resource is determined based on the first resource information.

In an optional implementation, the transceiver unit is further configured to: receive forwarding gain configuration information from a donor base station. The forwarding gain configuration information includes the association relationship between the forwarding gain and the resource information.

In an optional implementation, different resource information corresponds to different forwarding gains.

In an optional implementation, the forwarding gain is an absolute gain or an offset relative to a reference gain. The reference gain is one of the following information: a downlink forwarding gain or a preset gain.

In an optional implementation, the forwarding gain configuration information is indicated by semi-static signaling, or the forwarding gain configuration information is indicated by dynamic signaling.

In an optional implementation, priorities of forwarding gains corresponding to different resource information are different, and a priority of a forwarding gain corresponding to the channel information is higher than a priority of a forwarding gain corresponding to the signal information.

In an optional implementation, the forwarding gain configuration information includes: first gain configuration information and second gain configuration information. The first gain configuration information is indicated by the semi-static signaling, the second gain configuration information is indicated by the dynamic signaling, and a priority of the first gain configuration information is higher than a priority of the second gain configuration information.

In an optional implementation, the first forwarding gain includes a first gain value and a second gain value; the first gain value is different from the second gain value; the first gain value is determined based on the first gain configuration information; the second gain value is determined based on the second gain configuration information; and the transceiver unit is configured to: forward the received signal on the first time domain resource by using the first gain value.

In an optional implementation, the processing unit is further configured to: switch forwarding gains in first one or more time units of a second time domain resource if the first forwarding gain is determined based on the first gain configuration information, and a second forwarding gain is determined based on the second gain configuration information; or switch forwarding gains in last one or more time units of the first time domain resource if the first forwarding gain is determined based on the second gain configuration information, and a second forwarding gain is determined based on the first gain configuration information. The second forwarding gain is a forwarding gain used by the relay device to forward the received signal on the second time domain resource; and the first time domain resource and the second time domain resource are adjacent time domain resources, and the second forwarding gain is different from the first forwarding gain.

In an optional implementation, the transceiver unit is further configured to: report amplified noise power information to the donor base station, so that the donor base station determines the forwarding gain configuration information based on the amplified noise power information.

In an optional implementation, the transceiver unit is further configured to: receive indication information from the donor base station. The indication information indicates the relay device to measure the amplified noise power information on a specified resource; and the specified resource includes one or more of the following: a time domain resource, a frequency domain resource, and an access beam; and the processing unit is further configured to measure the amplified noise power information on the specified resource.

According to a third aspect, this application provides a communication system, including a donor base station and a relay device. The donor base station is configured to determine forwarding gain configuration information, and send the forwarding gain configuration information to the relay device. The forwarding gain configuration information includes an association relationship between a forwarding gain and resource information; and the resource information includes one or more of the following: signal information, channel information, a time domain resource number, backhaul beam information, and access beam information. The relay device is configured to determine a first forwarding gain corresponding to first resource information based on the association relationship between the forwarding gain and the resource information, where the resource information includes one or more of the following: signal information, channel information, a time domain resource number, backhaul beam information, and access beam information; and forward a received signal on a first time domain resource by using the first forwarding gain, where the first time domain resource is determined based on the first resource information.

In an optional implementation, different resource information corresponds to different forwarding gains.

In an optional implementation, the forwarding gain is an absolute gain or an offset relative to a reference gain. The reference gain is one of the following information: a downlink forwarding gain or a preset gain.

In an optional implementation, the forwarding gain configuration information is indicated by semi-static signaling, or the forwarding gain configuration information is indicated by dynamic signaling.

In an optional implementation, priorities of forwarding gains corresponding to different resource information are different, and a priority of a forwarding gain corresponding to the channel information is higher than a priority of a forwarding gain corresponding to the signal information.

In an optional implementation, the forwarding gain configuration information includes: first gain configuration information and second gain configuration information. The first gain configuration information is indicated by the semi-static signaling, the second gain configuration information is indicated by the dynamic signaling, and a priority of the first gain configuration information is higher than a priority of the second gain configuration information.

In an optional implementation, the first forwarding gain includes a first gain value and a second gain value; the first gain value is different from the second gain value; the first gain value is determined based on the first gain configuration information; the second gain value is determined based on the second gain configuration information; and the relay device is configured to: forward the received signal on the first time domain resource by using the first gain value.

In an optional implementation, the relay device is further configured to: switch forwarding gains in first one or more time units of a second time domain resource if the first forwarding gain is determined based on the first gain configuration information, and a second forwarding gain is determined based on the second gain configuration information; or switch forwarding gains in last one or more time units of the first time domain resource if the first forwarding gain is determined based on the second gain configuration information, and a second forwarding gain is determined based on the first gain configuration information. The second forwarding gain is a forwarding gain used by the relay device to forward the received signal on the second time domain resource; and the first time domain resource and the second time domain resource are adjacent time domain resources, and the second forwarding gain is different from the first forwarding gain.

In an optional implementation, the relay device is further configured to: report amplified noise power information to the donor base station, so that the donor base station determines the forwarding gain configuration information based on the amplified noise power information.

In an optional implementation, the relay device is further configured to: receive indication information from the donor base station. The indication information indicates the relay device to measure the amplified noise power information on a specified resource; and the specified resource includes one or more of the following: a time domain resource, a frequency domain resource, and an access beam; and the processing unit is further configured to measure the amplified noise power information on the specified resource.

According to a fourth aspect, this application provides a communication apparatus, including a processor. When the apparatus runs, the processor executes a computer program or instructions in a memory, to enable the communication apparatus to perform the method according to the first aspect or embodiments of the first aspect. The memory may be located in the processor, or may be implemented by using a chip independent of the processor. This is not limited in this application.

According to a fifth aspect, this application further provides a computer-readable storage medium. The computer-readable storage medium stores computer readable instructions, and when the computer-readable instructions are run on a computer, the computer is enabled to execute the method according to the first aspect or embodiments of the first aspect.

According to a sixth aspect, this application provides a computer program product including a computer program or instructions. When the computer program product is run on a computer, the computer is enabled to execute the method in the first aspect or embodiments of the first aspect.

According to a seventh aspect, this application provides a chip system. The chip system includes a processor, and may further include a memory, configured to implement the method in the first aspect or embodiments of the first aspect. The chip system may include a chip, or may include a chip and another discrete component.

For technical effects that can be achieved in the second aspect to the seventh aspect, refer to descriptions of technical effects that can be achieved in the corresponding design solutions in the first aspect. Details are not described herein again in this application.

DESCRIPTION OF EMBODIMENTS

To make objectives, technical solutions, and advantages of this application clearer, the following further describes this application in detail with reference to the accompanying drawings. An operation method in a method embodiment may also be applied to an apparatus embodiment or a system embodiment. In the description of this application, unless otherwise specified, "a plurality of" means two or more than two.

Figure 1:
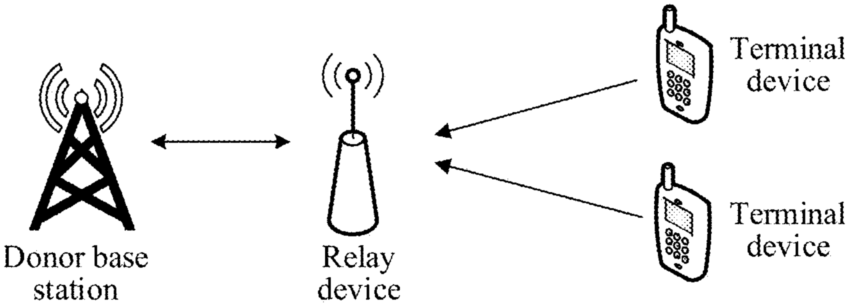
FIG. 1 is a diagram of a communication system according to an embodiment of this application.

FIG. 1 is a diagram of an architecture of a communication system applicable to this application. The communication system includes: a terminal device, a donor base station, and a relay device. In the communication system, quantities of terminal devices, donor base stations, and relay devices are not limited. The relay device may amplify a downlink signal from the donor base station, and forward an amplified downlink signal to the terminal device; or may amplify an uplink signal from the terminal device, and forward an amplified uplink signal to the donor base station.

The terminal device may also be referred to as a terminal, user equipment (UE), a mobile station (MS), a mobile terminal (MT), or the like. The terminal device may be a mobile phone, a tablet computer (Pad), a computer with a wireless transceiver function, a virtual reality (VR) terminal device, an augmented reality (AR) terminal device, a wireless terminal in industrial control, a wireless terminal in self-driving such as an in-vehicle device, a wireless terminal in remote medical surgery, a wireless terminal in a smart grid, a wireless terminal in transportation safety, and a wireless terminal in a smart city such as a video surveillance device, a wireless terminal in a smart home such as a smart home appliance (a speaker, a television, a refrigerator, or the like), or the like.

If the various terminal devices described above are located on a vehicle (for example, placed in the vehicle or installed in the vehicle), the terminals may be considered as in-vehicle terminal devices. An in-vehicle terminal device, for example, is also referred to as an on-board unit (OBU).

The donor base station may be a device that communicates with the terminal device and the relay device. The donor base station may be a relay station or an access point. The donor base station may alternatively be an evolved NodeB (eNB, or e-NodeB) in long term evolution (LTE). The donor base station may alternatively be a radio controller in a cloud radio access network (CRAN) scenario. The donor base station may alternatively be a base station device in a future fifth generation (5G) network or a network device in a future evolved public land mobile network (PLMN). The donor base station may alternatively be a wearable device or an in-vehicle device. This is not limited in embodiments of this application.

The relay device is a device with a forwarding function, and may be one of the foregoing donor base station or terminal device, or may be an independent device form, or may be an in-vehicle device, or an apparatus disposed on a mobile object. The relay device may be referred to as a relay node (RN), a relay sending and receiving point (rTRP), an integrated access and backhaul (IAB) node, a repeater, a smart repeater, or the like. An upper-level node of the relay node may be a gNB (including a gNB-DU, a gNB-CU, and the like), or may be another relay node. In addition, the relay node in this application may alternatively be a radio frequency signal reflection or refraction device such as an intelligent reflecting surface (IRS).

Figure 2:
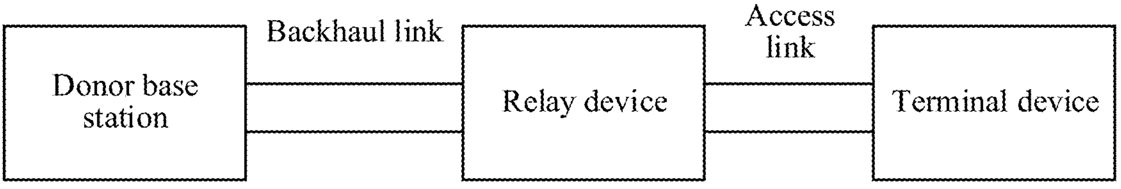
FIG. 2 is a diagram of a relay device according to an embodiment of this application.
Figure 2:
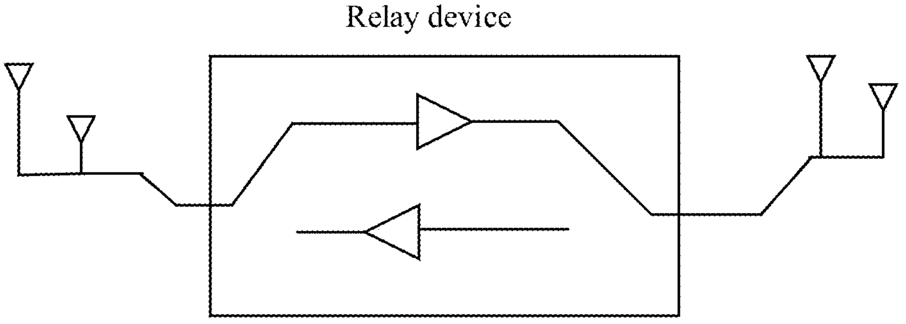

It should be noted that the relay device in embodiments of this application may include a plurality of antenna panels. FIG. 2 is merely an example of a relay device with two antenna panels (it is assumed that two antennas are disposed on one antenna panel). One antenna panel of the relay device faces a donor base station, and is configured to receive a downlink signal of the donor base station or forward an uplink signal to the donor base station. The other antenna panel faces a terminal device, and is configured to receive an uplink signal sent by the terminal device or forward a downlink signal to the terminal device. A link between the relay device and the donor base station is referred to as a backhaul link (which may also be referred to as a fronthaul link), and a link between the relay device and the terminal device is referred to as an access link.

It should be further noted that the relay device may transmit an uplink signal or a downlink signal via an unused beam. The beam may be a wide beam, a narrow beam, or another type of beam. Different beams may be considered as different resources. Same information or different information may be sent via different beams. Optionally, a plurality of beams having a same or similar communication feature may be considered as a type of beams. In this application, beams of the relay device may be classified into backhaul beams and access beams. The backhaul beam of the relay device is for forwarding the uplink signal from the terminal device to the donor base station, and the access beam of the relay device is for receiving the uplink signal from the terminal device. The beam may correspond to a time resource, and/or a space resource, and/or a frequency domain resource. Optionally, the beam may further correspond to a reference signal resource (for example, a beamforming reference signal resource) or beamforming information. In addition, the beam may further correspond to information associated with a reference signal resource of the donor base station. A reference signal may be a channel state information reference signal (CSI-RS), a synchronization signal broadcast channel block (SS/PBCH block), a demodulation reference signal (DMRS), a phase tracking signal (PTRS), a tracking signal (TRS), or the like. The information associated with the reference signal resource may be a reference signal resource identifier, quasi-collocation (QCL) information (especially QCL of a type D type), or the like.

This embodiment of this application may be further applied to another communication system, for example: a long term evolution (LTE) system, an LTE frequency division duplex (FDD) system, an LTE time division duplex (TDD) system, a universal mobile telecommunications system (UMTS), a worldwide interoperability for microwave access (WiMAX) communication system, a future fifth generation (5G) mobile communication system, new radio (NR), or the like. The 5G mobile communication system described in this application includes a non-standalone (NSA) 5G mobile communication system and/or a standalone (SA) 5G mobile communication system. The technical solutions provided in this application may be further applied to a future communication system, for example, a sixth generation mobile communication system. The communication system may alternatively be a PLMN network, a device-to-device D2D network, a machine-to-machine (M2M) network, an IoT network, or another network.

In a communication system to which the solutions of this application are applicable, the uplink signal that can be received by the relay device includes not only useful information, but also noise and interference. If the uplink signal is just slightly amplified, the network device cannot receive the useful information in the uplink signal. To enable the relay device to perform amplification by using a proper value (namely, a gain) when forwarding a received signal, to improve performance of forwarding the received signal, this application provides a signal forwarding method.

Figure 3:
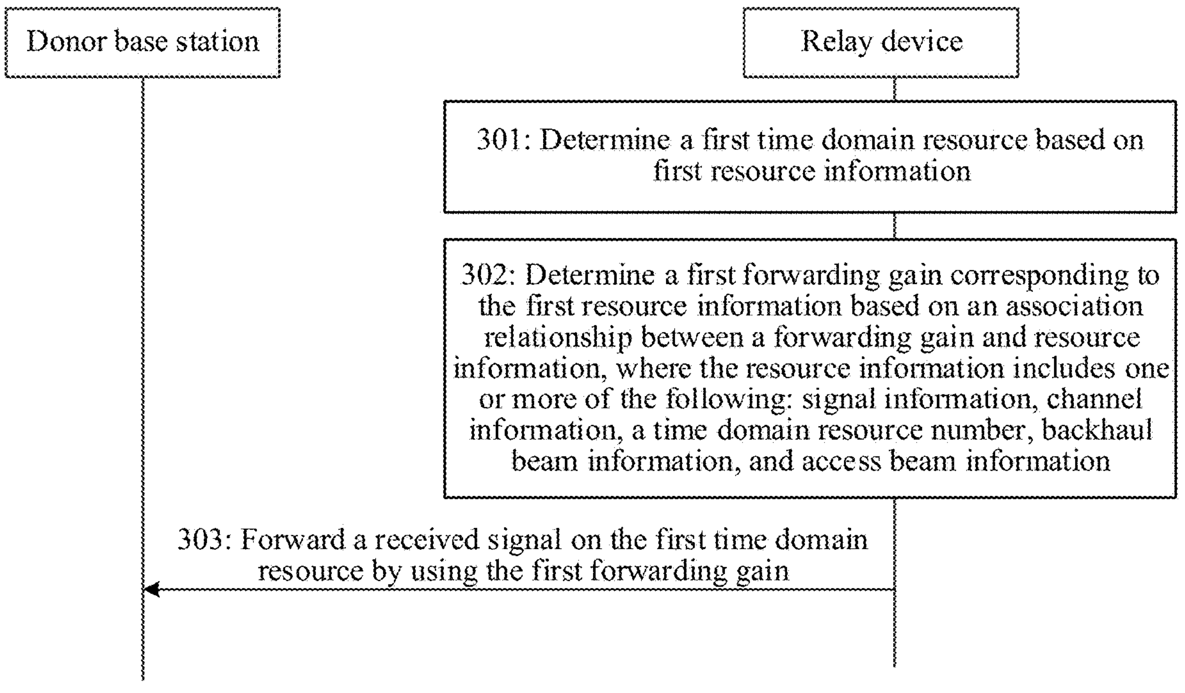
FIG. 3 is a flowchart of a signal forwarding method according to an embodiment of this application.

The following describes a signal forwarding method according to an embodiment of this application with reference to FIG. 3. The signal forwarding method is mainly implemented through interaction between a relay device and a donor base station. In actual execution, a plurality of relay devices, donor base stations, and terminal devices may be involved, which are not illustrated one by one. One relay device and one donor base station are used as an example for illustration herein. The method may be performed as below.

301: The relay device determines a first time domain resource based on first resource information.

302: The relay device determines, based on an association relationship between a forwarding gain and resource information, a first forwarding gain corresponding to the first resource information. The resource information includes one or more of the following: signal information, channel information, a time domain resource number, backhaul beam information, and access beam information.

It should be noted that the first resource information may be one or more of the foregoing resource information, and the first time domain resource may be a slot, a symbol, a TDD configuration periodicity, a subframe, or the like. The first resource information may include an identifier of a time domain resource or a time unit, for example, a slot number or a symbol number. The first resource information may further include signal or channel information, for example, SRS signal information, PRACH channel information, or PUCCH channel information. The relay device may determine, based on broadcast or unicast signaling sent by a network device or the donor base station, time domain resources corresponding to each channel or each signal (namely, the first resource information). For example, the relay device determines, by reading broadcast information (for example, SIB information), a time domain resource occupied by a PRACH channel (the first resource information is equivalent to the PRACH channel information), or the relay device determines, by reading unicast information (for example, RRC information), a time domain resource occupied by an SRS signal (the first resource information is equivalent to the SRS signal information).

303: Forward a received signal on the first time domain resource by using the first forwarding gain.

In an optional implementation, the relay device may receive forwarding gain configuration information from the donor base station. The forwarding gain configuration information includes the association relationship between the forwarding gain and the resource information. In other words, forwarding gain information may be preconfigured by the donor base station, and after configuration, the donor base station sends the forwarding gain configuration information to the relay device; or may be forwarding gain configuration information sent by the donor base station only after receiving a piece of indication information. In addition, it should be noted that the forwarding gain information may be uplink forwarding gain information or may be downlink forwarding gain information. This is not limited in this application. An example in which the forwarding gain information is uplink forwarding gain information is merely used in the following for example description.

In addition, as a location of a terminal device continuously changes or resource information occupied by a sent signal changes, the uplink forwarding gain information preconfigured by the donor base station may not be applicable in real time, and the donor base station may update uplink forwarding gain configuration information after sending the uplink forwarding gain configuration information, and send updated uplink forwarding gain configuration information to the relay device. Alternatively, when it is determined that attribute information (a location, a resource occupied by a signal, or the like) of a terminal device changes, the uplink forwarding gain configuration information may be updated in time, and updated uplink forwarding gain configuration information may be sent to the relay device. In addition, a configuration rule of the uplink forwarding gain information may further include another type. Details are not described herein. All the foregoing several configuration rules or a combination of the foregoing several configuration rules are applicable to this application.

In addition, the received signal may be from the donor base station or the terminal device. A signal from the donor base station may be understood as a downlink signal. After receiving the downlink signal, the relay device may forward the downlink signal to the terminal device based on the forwarding gain. A signal from the terminal device may be understood as an uplink signal. After receiving the uplink signal, the relay device may forward the uplink signal to the donor base station based on the forwarding gain. In addition, when the relay device does not receive the uplink signal or the downlink signal, the received signal may be only an interference or noise signal. In this case, the relay device forwards the interference or noise signal based on the forwarding gain.

It should also be noted that the uplink forwarding gain configuration information is associated with a plurality of resource information (the signal information, the channel information, the time domain resource number, the backhaul beam information, the access beam information, and the like), that is, different resource information or different resource information sets may correspond to same or different uplink forwarding gain values. This may be divided into the following cases during implementation.

Before configuration of the uplink forwarding gain configuration information in this application is described, a working mechanism of the relay device and the donor base station is briefly described first. It is assumed that the relay device needs to perform uplink forwarding on a received signal (regardless of a wanted signal or an interference noise signal) on a time domain resource 1. The relay device may first determine first resource information that is associated with the time domain resource, and then determine a gain value of an uplink forwarding gain based on the first resource information and the association relationship between the forwarding gain and the resource information. If the gain value of the uplink forwarding gain is A, regardless of whether the relay device receives an uplink signal on the time domain resource 1, the relay device performs an uplink forwarding operation based on A, that is, if the relay device does not receive the uplink signal in actual work, the relay device still needs to forward amplified noise, an interference signal, and the like. If the relay device receives the uplink signal in actual work, the relay device may forward the uplink signal, noise, and interference. If an uplink signal from the terminal device exists on the first time domain resource, the uplink signal, noise, and interference information are forwarded or amplified based on the uplink forwarding gain configuration information.

Case 1: The Uplink Forwarding Gain Configuration Information is the Same.

The donor base station does not distinguish the resource information and configures the same uplink forwarding gain information. For example, all gain values of the uplink forwarding gains are A, and the relay device performs, on all time domain resources on which uplink forwarding is started, an uplink forwarding operation on the received signal based on the gain value A.

Case 2: Different Uplink Forwarding Gains are Configured for Signals or Channels.

The donor base station may configure or indicate forwarding gain information for a specific channel or signal of the relay device, that is, different forwarding gain information may be configured or indicated for different uplink channels or signals. The uplink channel may include a PRACH, a physical uplink shared channel (PUSCH), a PUCCH, or the like. The signal may include an SRS. In actual application, a type of a channel and a type of a signal are not limited. The PRACH may be one or more specific RACH occasions, or may be one or more RACH occasions associated with one or more specific SSBs. The specific RACH occasion or SSB information may be configured or indicated by the donor base station for the relay device. For example, the donor base station indicates a RACH occasion index or an SSB index for the relay device. Alternatively, the specific SSB or RACH occasion may be an SSB or RACH occasion used by the relay device to access the donor base station. The SRS may be one or more specific SRS resources, and information about the one or more SRS resources, for example, a resource number, may be indicated by the donor base station for the relay device. After configuring the uplink forwarding gain information related to the signal or channel, the donor base station sends the uplink forwarding gain information to the relay device, and the relay device performs an uplink forwarding operation based on the uplink forwarding gain information.

For example, when the forwarding gain information is configured for the PRACH channel, the relay device may perform the following operations:

- determining, based on broadcast or unicast information sent by the donor base station, a resource (namely, the first time domain resource) occupied by one or more PRACH channels (namely, the first resource information); and
- performing uplink forwarding on the determined one or more PRACH resources based on the configured uplink forwarding gain information.

The gain information of uplink forwarding is shown in Table 1. The relay device determines that the first resource information is a PRACH. By querying Table 1, it may be learned that uplink forwarding gain information corresponding to the channel PRACH is A1. In this case, the relay device performs, based on a time domain resource occupied by the gain A1 on the PRACH, uplink forwarding on a received signal from the time domain resource. The relay device determines that the first resource information is an SRS. By querying Table 1, uplink forwarding gain information corresponding to the SRS is C1, and the relay device performs, based on a time domain resource occupied by the gain C1 on the SRS, uplink forwarding on a received signal from the time domain resource. Certainly, in actual application, only one or more rows in the following table may be applied. This is not limited in this application.

TABLE 1

| Signal information/channel information | Uplink forwarding gain |
|---|---|
| PRACH | A gain value is A1. |
| PUCCH | A gain value is B1. |
| SRS | A gain value is C1. |
| . . . | . . . |

It should be understood that different uplink forwarding gain information may also be configured or indicated for different components of a same channel or signal. For example, different uplink forwarding gain information may be configured for different RACH occasions, or different uplink forwarding gain information may be configured for different SRS resources. As shown in Table 2, uplink forwarding gain information corresponding to a PRACH #K1 is A11. When determining that the first resource information is the PRACH #K1, the relay device may perform, based on a time domain resource occupied by the gain A11 on the PRACH #K1, uplink forwarding on a received signal from the time domain resource. Uplink forwarding gain information corresponding to a PRACH #K2 is A12. When determining that the first resource information is the PRACH #K2, the relay device may perform, based on a time domain resource occupied by the gain A12 on the PRACH #K2, uplink forwarding on a received signal from the time domain resource. Certainly, in actual application, only one or more rows in the following table may be applied. This is not limited in this application.

TABLE 2

| Signal information/channel information | Uplink forwarding gain |
|---|---|
| PRACH #k1 | A gain value is A11. |
| PRACH #k2 | A gain value is A12. |
| . . . | . . . |

Case 3: Different Uplink Forwarding Gains are Configured for Time Domain Resources.

The donor base station configures uplink forwarding gain information for a time domain resource. The time domain resource may be a specific slot, subframe, symbol set, symbol, or the like. Optionally, the time domain resource may be a periodic time domain resource, for example, a fifth slot in every 20 slots, an uplink symbol in a fifth slot in every 20 slots, or a second subframe or a second symbol in every 20 subframes. Optionally, the time domain resource may be an $n^{th}$ time unit, for example, a slot, an uplink slot, or a symbol, after the relay node receives configured or indicated information. Which resource the time domain resource refers to is not limited herein in this application. After configuring the uplink forwarding gain information related to the time domain resource, the donor base station sends the uplink forwarding gain information to the relay device, and the relay device performs an uplink forwarding operation based on the uplink forwarding gain information. The uplink forwarding gain information is shown in Table 3. In a slot 5, the uplink forwarding operation is performed on the received signal based on a gain A2. On a symbol 13, the uplink forwarding operation is performed on the received signal based on a gain B2. Certainly, in actual application, only one or more rows in the following table may be applied. This is not limited in this application.

In one example case, the time domain resource of the uplink forwarding gain information configured by the donor base station includes a downlink subresource or a flexible subresource. For example, a slot for which the uplink forwarding gain information is configured includes a plurality of downlink symbols and a plurality of flexible symbols.

In an implementation, the relay device ignores the uplink forwarding gain information on the downlink symbol and the flexible symbol. In another implementation, the relay device ignores the uplink forwarding gain information on the downlink symbol, and performs uplink forwarding on the flexible symbol based on the configured gain information.

TABLE 3

| Time domain resource number | Uplink forwarding gain |
|---|---|
| Slot 5 | A gain value is A2. |
| Symbol 13 | A gain value is B2. |
| Subframe 2 | A gain value is C2. |
| . . . | . . . |

Case 4: Different Uplink Forwarding Gains are Configured for Backhaul Beams.

The donor base station configures different uplink forwarding gain information for different backhaul beams. After configuring the uplink forwarding gain information, the donor base station sends the uplink forwarding gain information to the relay device, and the relay device performs an uplink forwarding operation based on the uplink forwarding gain information. The uplink forwarding gain information is shown in Table 4. When a backhaul beam 1 is used, the uplink forwarding operation is performed on the received signal based on a gain A3. When a backhaul beam 2 is used, the uplink forwarding operation is performed on the received signal based on a gain B3. Certainly, in actual application, only one or more rows in the following table may be applied. This is not limited in this application.

In a protocol, backhaul beam information may be transmission configuration indicator (TCI) information for communication between the relay node and the donor base station, QCL information, spatial relation information, or the like. Alternatively, the backhaul beam information may be channel or signal information between the relay node and the donor base station, for example, an SSB index, a CSI-RS identifier (for example, a resource ID), or an SRS identifier (for example, a resource ID).

TABLE 4

| Backhaul beam information | Uplink forwarding gain |
|---|---|
| Backhaul beam 1 | A gain value is A3. |
| Backhaul beam 2 | A gain value is B3. |
| Backhaul beam 3 | A gain value is C3. |
| . . . | . . . |

Case 5: Different Uplink Forwarding Gains are Configured for Access Beams.

The donor base station configures different uplink forwarding gain information for different access beams. After configuring the uplink forwarding gain information, the donor base station sends the uplink forwarding gain information to the relay device, and the relay device performs an uplink forwarding operation based on the uplink forwarding gain information. The uplink forwarding gain information is shown in Table 5. When an access beam 1 is used, the uplink forwarding operation is performed on the received signal based on a gain A4. When the access beam 2 is used, the uplink forwarding operation is performed on the received signal based on a gain B4. Certainly, in actual application, only one or more rows in the following table may be applied. This is not limited in this application.

An access beam information may be indicated by information such as an access beam number, an access beam group number, a reference signal identifier, or the like. The reference signal identifier includes an SSB index, a CSI-RS identifier (for example, a resource ID), an SRS identifier (for example, a resource ID), or the like.

TABLE 5

| Access beam information | Uplink forwarding gain |
|---|---|
| Access beam 1 | A gain value is A4. |
| Access beam 2 | A gain value is B4. |
| Access beam 3 | A gain value is C4. |
| . . . | . . . |

Case 6: Different Uplink Forwarding Gains are Configured for Different Resource Information Combinations.

It should be noted that the donor base station may configure the uplink forwarding gain information based on different resource information combinations, for example, configure the uplink forwarding gain information based on a time domain resource and channel information; configure the uplink forwarding gain information based on a channel and an access beam; or configure the uplink forwarding gain information based on a time domain resource and a backhaul beam. A plurality of different resource information combinations are included, and are not described one by one herein. All cases in which the uplink forwarding gain information is configured in a manner based on a resource information combination are applicable to this application. Table 6 is described in which the uplink forwarding gain information is configured by using a combination of a signal or channel type, a channel/signal identifier, a backhaul beam, and an access beam. When the channel is a PRACH, the channel identifier is #k1, the backhaul beam is a spatial relation #n1, and the access beam is a beam #l1, the relay device performs an uplink forwarding operation on the received signal based on a gain X; and when the signal is an SRS, the signal identifier is #m1, the backhaul beam is a spatial relation #n3, and the access beam is a Beam #l3, the relay device performs the uplink forwarding operation on the received signal based on a gain Z. Certainly, in actual application, only one or more rows in the following table may be applied. This is not limited in this application.

TABLE 6

| Signal/ Channel type | Channel/ Signal identifier | Backhaul beam information | Access beam information | Uplink forwarding gain |
|---|---|---|---|---|
| PRACH | #k1 | Spatial relation #n1 | Beam #l1 | X |
| PRACH | #k2 | Spatial relation #n2 | Beam #l2 | Y |
| SRS | #m1 | Spatial relation #n3 | Beam #l3 | Z |
| SRS | #m2 | Spatial relation #n4 | Beam #l4 | W |

In an implementation, the foregoing table may indicate that the donor base station configures different backhaul beam information, access beam information, and configured uplink forwarding gain information for different uplink channels. In actual application, the donor base station may also configure only one of the backhaul beam information and the access beam information, or may even configure another information. This is not limited in this application. For example, the donor base station configures a backhaul beam spatial relation #n2 and an access beam Beam #l2 for a PRACH channel identifier #k2 (for example, an RACH occasion #k2), and a configured uplink forwarding gain is a gain Y. Correspondingly, when performing uplink forwarding, the relay device may select the backhaul beam spatial relation #n2 and the access beam Beam #l2 with reference to configuration information of the RACH occasion #k2, and perform the uplink forwarding operation on the received signal based on the gain Y. This is merely an example for description herein, and is not illustrated one by one. An example in which the donor base station may configure the uplink forwarding gain information based on a time domain resource and a backhaul beam is used for description below. Table 7 is described in which the uplink forwarding gain information is configured by using a combination of a time domain resource, a backhaul beam, and an access beam. In a fifth slot, the backhaul beam is a spatial relation #n1, and the access beam is a Beam #l1. The relay device performs an uplink forwarding operation on the received signal based on a gain X. Certainly, in actual application, only one or more rows in the following table may be applied. This is not limited in this application.

TABLE 7

| Time domain resource number | Backhaul beam information | Access beam information | Uplink forwarding gain |
|---|---|---|---|
| Slot 5 | Spatial relation #n1 | Beam #l1 | X |
| Symbol 13 | Spatial relation #n2 | Beam #l2 | Y |
| Subframe 2 | Spatial relation #n3 | Beam #l3 | Z |
| . . . | . . . | . . . | . . . |

In an implementation, the foregoing table may indicate that the donor base station configures different backhaul beam information, access beam information, and configured uplink forwarding gain information for different uplink time domain resources. In actual application, the donor base station may also configure only one of the backhaul beam information and the access beam information, or may even configure another information. This is not limited in this application. For example, the donor base station configures a backhaul beam spatial relation #n2 and an access beam Beam #l2 for a thirteen symbol, and a configured uplink forwarding gain is a gain Y. Correspondingly, when performing uplink forwarding, the relay device may select the backhaul beam spatial relation #n2 and the access beam Beam #l2 with reference to configuration information of the symbol 13, and perform the uplink forwarding operation on the received signal based on the gain Y. This is merely an example for description herein, and is not illustrated one by one.

In the foregoing different cases, different uplink forwarding gains are configured based on different resource information, so that when scheduling a remote user, the donor base station indicates the relay device to perform forwarding by using a higher uplink forwarding gain, thereby improving a coverage enhancement capability of the relay device. When scheduling a near-end user, the donor base station indicates the relay device to perform forwarding by using a lower uplink forwarding gain, thereby avoiding interference caused by amplified noise. When receiving a common channel (for example, a PRACH), the donor base station indicates the relay device to perform forwarding by using a proper forwarding gain, thereby balancing access success rates of a directly connected user and a non-directly connected user. The directly connected user is a user directly connected to the donor base station, and the non-directly connected user is a user accessing the donor base station through the relay device. Details are as follows. A higher amplification gain (namely, the forwarding gain) can increase an access probability of the non-directly connected user. However, extra amplified noise introduced by the higher amplification gain may interfere with an uplink signal of the directly connected user, thereby reducing an access probability of the directly connected user. A lower amplification gain can avoid or reduce impact of the amplified noise and interference on the directly connected user, but the lower amplification gain can slightly improve coverage on the non-directly connected user. It should be noted that the foregoing user refers to a terminal device.

In this application, relationships between different resource information and uplink forwarding gains are configured to indicate the relay device to perform an uplink forwarding operation, so that uplink forwarding performance of the relay device can be improved.

In an optional implementation, the forwarding gain indicated or configured by the donor base station may be an absolute gain value, or may be a relative gain value. Whether the uplink forwarding gain is an absolute gain value or a relative gain value is not limited herein in this application. If being an absolute gain value, the uplink forwarding gain may be a gain value of an amplification circuit (unit: decibel dB or linear multiple), where the linear multiple refers to a linear amplification multiple of power or a linear amplification multiple of amplitude. For example, the uplink forwarding gain information is 10 dB, that is, the gain value of the amplification circuit is 10 dB. If being a relative gain value, the uplink forwarding gain may be an offset value (unit: decibel dB or linear multiple) relative to a reference gain. For example, if the uplink forwarding gain is 5 dB and the reference gain is 30 dB, an actual uplink forwarding gain is 35 dB (30+5 dB).

It should be noted that if the uplink forwarding gain is a relative gain value, the reference gain may be configured based on a downlink forwarding gain. For example, if the downlink forwarding gain is 20 dB, the reference gain may be set to 20 dB. Alternatively, the reference gain may be set based on a value predefined by the donor base station. For example, if the predefined value is 30 dB, the reference gain is set to 30 dB. It should be further noted that for different resource information or a combination of different resource information, values of the reference gain may be different. For example, for a time domain resource, the reference gain is A; for a backhaul beam, the reference gain is B; for an access beam, the reference gain is C; and for a time domain resource 1 and an access beam, the reference gain is D.

In an optional implementation, the donor base station may indicate the relay device to perform the uplink forwarding operation in different manners as follows.

Manner 1: The donor base station configures the uplink forwarding gain information for the relay device, but the donor base station indicates the relay device not to perform the uplink forwarding operation, that is, the relay device does not perform the uplink forwarding operation regardless of whether the relay device receives the uplink signal.

Manner 2: The donor base station periodically indicates the relay device to perform the uplink forwarding operation. For example, the donor base station indicates the relay device to perform the uplink forwarding operation once every 10 slots.

Manner 3: When the uplink forwarding gain includes a maximum forwarding gain, the donor base station indicates the relay device to perform the uplink forwarding operation on the received signal based on the maximum forwarding gain. For example, a maximum uplink forwarding gain of the relay device is 50 dB, and the relay device performs the uplink forwarding operation on the received signal based on a gain value of 50 dB.

Manner 4: The donor base station indicates forwarding configuration information used by the relay device to perform the uplink forwarding operation, for example, an uplink amplification power, an access beam, or a backhaul beam. For example, the donor base station indicates the relay device to perform the uplink forwarding operation based on a power 1; the donor base station indicates the relay device to perform the uplink forwarding operation based on an access beam 1; or the donor base station indicates the relay device to perform the uplink forwarding operation based on a power 1, an access beam 1, and a backhaul beam 2. A11 operations for indicating forwarding configuration information are applicable to this application, and are not illustrated one by one herein.

In an optional embodiment, the donor base station may indicate forwarding gain configuration information by signaling, and indication may be performed by the following signaling. Details are as follows.

Signaling 1: Semi-Static Signaling

It should be noted that the uplink forwarding gain configuration information indicated by the donor base station by the semi-static signaling may be stored in the relay device. The semi-static signaling may be RRC signaling, or may be another signaling. This is not limited in this application. The semi-static signaling may indicate a plurality of types of uplink forwarding gains configured in the foregoing different cases, the resource information and the uplink forwarding gain configuration information that are shown in any table shown in Table 1 to Table 7, or another uplink forwarding gain configuration information. This is not limited in this application.

Signaling 2: Dynamic Signaling

It should be noted that the dynamic signaling is more flexible, and can flexibly indicate uplink forwarding gains of different resource information configurations, for example, indicate uplink forwarding gains corresponding to all resource information by using DCI or a MAC CE, indicate an uplink forwarding gain of a time domain resource, or the like. This is not limited in this application.

The dynamic signaling may indicate the uplink forwarding gains configured in the foregoing different cases, and may indicate the uplink forwarding gain configuration information shown in any one of the rows in Table 1 to Table 7, for example, the dynamic signaling indicates the relay device to select the backhaul beam spatial relation #n2 and the access beam Beam #l2 on a symbol 13 of a time domain resource 2 when performing uplink forwarding, and perform the uplink forwarding operation based on the gain Y. The dynamic signaling may further indicate another uplink forwarding gain information. This is not limited in this application. In addition, after the donor base station indicates the relay device to perform an uplink forwarding operation by the dynamic signaling, the donor base station may further indicate another uplink forwarding operation by new dynamic signaling. Each time the relay device is indicated, a same or different gain value may be used for performing the uplink forwarding operation. This is not limited in this application.

In addition, the semi-static signaling and the dynamic signaling may jointly configure or indicate the uplink forwarding gain information, for example: the semi-static signaling configures an uplink forwarding gain corresponding to a signal or a channel, and the dynamic signaling indicates an uplink forwarding gain corresponding to resource information other than the signal or the channel. For example, that an uplink forwarding gain corresponding to a PRACH is X is indicated by the RRC signaling, and that a forwarding gain corresponding to a time domain resource 1 (for example, a slot 3, or a slot 3 to a slot 10) is Y is indicated by using the DCI. The semi-static signaling and the dynamic signaling indicate an uplink forwarding gain corresponding to which resource information is merely described as an example, and is not limited herein.

In this application, the donor base station may indicate the uplink forwarding gain of the relay device by semi-static configuration signaling and/or the dynamic signaling. The donor base station may set an appropriate forwarding gain for the relay device based on a feature of a forwarding channel or signal of the relay device, to ensure a balance between an uplink coverage improvement capability of the relay device and a noise interference amplification effect.

Figure 4:
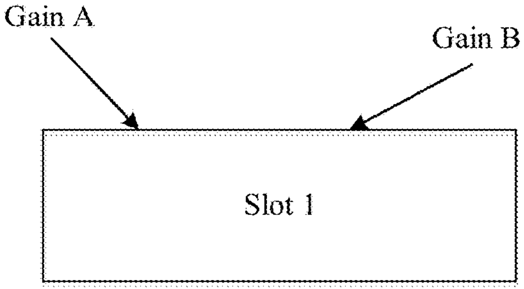
FIG. 4 is a diagram of a gain conflict according to an embodiment of this application.

Because the uplink forwarding gain configuration information may be configured or indicated by the semi-static signaling or the dynamic signaling, different uplink forwarding gains may be configured or indicated for same resource information. As shown in FIG. 4, a slot 1 includes a PRACH channel (for example, a RACH occasion), the donor base station configures an uplink forwarding gain corresponding to the PRACH as A by the semi-static signaling, and the donor base station further indicates an uplink forwarding gain corresponding to the slot 1 as B by the dynamic signaling. In this case, there are two gain values, A and B respectively, for performing the uplink forwarding operation in the slot 1. In this case, a gain conflict exists.

In an optional embodiment, in consideration of existence of the gain conflict, in this application, priorities are specified based on a case in which same resource information corresponds to different uplink gains, and the relay device may perform the uplink forwarding operation in a priority order. The forwarding gain configuration information includes: first gain configuration information and second gain configuration information. The first gain configuration information is indicated by the semi-static signaling, the second gain configuration information is indicated by the dynamic signaling, and a priority of the first gain configuration information is higher than a priority of the second gain configuration information. During implementation of this application, when 303 is performed, the first forwarding gain includes a first gain value and a second gain value; the first gain value is different from the second gain value; the first gain value is determined based on the first gain configuration information; and the second gain value is determined based on the second gain configuration information. In this case, the relay device may forward the received signal on the first time domain resource by using the first gain value. Herein, it is assumed that a reason why the priority of the forwarding gain configuration information indicated by the semi-static signaling is higher is to ensure smooth access of a directly connected user and a non-directly connected user.

On the premise that an uplink forwarding gain priority is set in this embodiment of this application, when the gain conflict shown in FIG. 4 occurs, considering that an uplink forwarding gain value corresponding to the uplink forwarding gain configuration information indicated by the semi-static signaling is A, the relay device performs uplink forwarding on the received signal based on the gain A. In addition, priority setting is also applicable to an uplink forwarding gain corresponding to another resource information, which is not described one by one herein. Only an uplink forwarding gain corresponding to a backhaul beam is used as an example for description. For example, the semi-static signaling indicates that an uplink forwarding gain corresponding to a backhaul beam 1 is X. The dynamic signaling indicates that the uplink forwarding gain corresponding to the backhaul beam 1 is Y. Because the priority of the forwarding gain configuration information indicated by the semi-static signaling is higher than the priority of the forwarding gain configuration information indicated by the dynamic signaling, the relay device may perform uplink forwarding on the received signal based on the gain X.

It should also be noted that the gain conflict may also occur in uplink forwarding gain information indicated by using same signaling, and priorities of forwarding gains corresponding to different resource information are different, where a priority of a forwarding gain corresponding to the channel information is higher than a priority of a forwarding gain corresponding to the signal information. For example, in the foregoing FIG. 4, the slot 1 indicates the uplink forwarding gain corresponding to the PRACH by the semi-static signaling as A, and indicates the uplink forwarding gain corresponding to the SRS by the semi-static signaling as B. It is assumed that a priority of the PRACH is higher than that of the SRS. In this case, the relay device may perform uplink forwarding on the received signal based on the uplink forwarding gain A. For example, in the foregoing FIG. 4, the slot 1 indicates the uplink forwarding gain corresponding to the PUCCH by the dynamic signaling as A, and indicates the uplink forwarding gain corresponding to the SRS by the dynamic signaling as B. It is assumed that a priority of the SRS is higher than that of the PUCCH. In this case, the relay device may perform uplink forwarding on the received signal based on the uplink forwarding gain B. In addition, a priority order of the uplink forwarding gains indicated by the semi-static signaling or a priority order of the uplink forwarding gains indicated by the dynamic signaling is not limited herein. The donor base station and the relay device may agree on a priority of each piece of resource information on a same time domain resource through a protocol.

To avoid the gain conflict, in this embodiment of this application, it may be further defined that the donor base station configures a same uplink forwarding gain for a same time domain resource or a same time unit.

In an optional implementation, the first time domain resource and a second time domain resource are adjacent time domain resources, but a forwarding gain configured or indicated for the first time domain resource is the first forwarding gain, and a forwarding gain configured or indicated for the second time domain resource is a second forwarding gain (the relay device may determine the second forwarding gain based on second resource information and the association relationship between the forwarding gain and the resource information, and then the relay device may forward the received signal on the second time domain resource by using the second forwarding gain), and the second forwarding gain is different from the first forwarding gain. If the first forwarding gain is determined based on the first gain configuration information (namely, the forwarding gain information indicated by the semi-static signaling), and the second forwarding gain is determined based on the second gain configuration information (namely, the forwarding gain information indicated by the dynamic signaling), forwarding gains are switched in first or more time units of the second time domain resource; or if the first forwarding gain is determined based on the second gain configuration information, and the second forwarding gain is determined based on the first gain configuration information, forwarding gains are switched in last one or more time units of the first time domain resource.

Figures 5A, 5B:
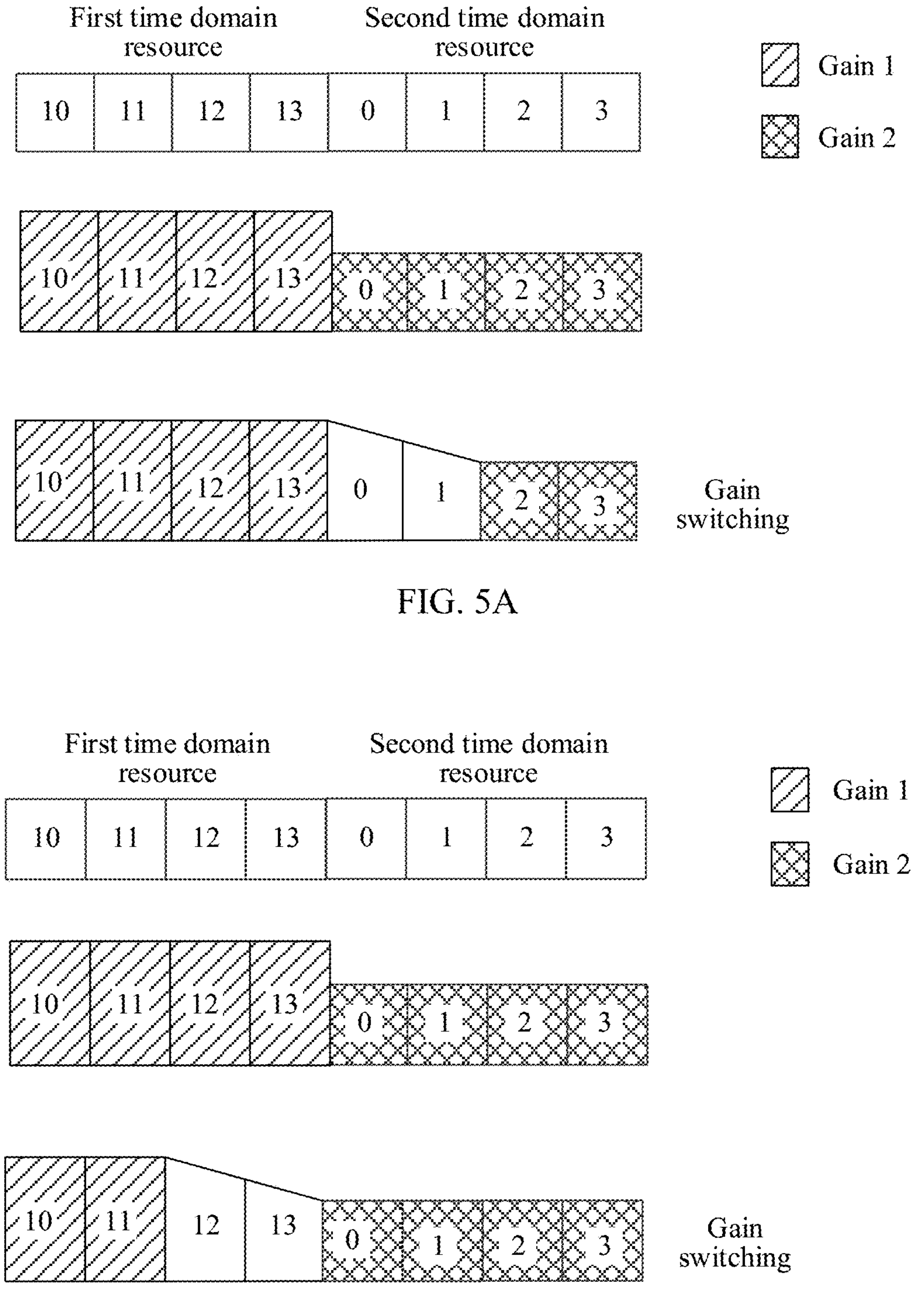
FIG. 5A is a diagram of gain switching according to an embodiment of this application.
FIG. 5B is a diagram of gain switching according to an embodiment of this application.

To better describe how to switch the forwarding gains, FIG. 5A and FIG. 5B are used as illustrations. FIG. 5A is a diagram of a gain switching scenario that may be applied to this application. A first time domain resource and a second time domain resource are adjacent time domain resources, and a symbol 13 of the first time domain resource is adjacent to a symbol 0 of the second time domain resource. If an uplink forwarding gain corresponding to the first time domain resource is a gain 1, an uplink forwarding gain corresponding to the second time domain resource is a gain 2. If the gain 1 is determined based on first gain configuration information, and the gain 2 is determined based on second gain configuration information, because a priority of the first gain configuration information is higher than a priority of the second gain configuration information, a gain switching operation may be performed on the symbol 0 and a symbol 1 of the second time domain resource, that is, the gain 2 is gradually switched to the gain 1. FIG. 5B is a diagram of a gain switching scenario that may be applied to this application. If a gain 1 is determined based on second gain configuration information, and a gain 2 is determined based on first gain configuration information, because a priority of the first gain configuration information is higher than a priority of the second gain configuration information, a gain switching operation may be performed on a symbol 12 and a symbol 13 of a first time domain resource, that is, the gain 1 is gradually switched to the gain 2, as shown in FIG. 5B. It should be noted that FIG. 5A and FIG. 5B are merely descriptions. When actually performing gain switching, the relay device may perform gain switching based on a linear function, or may perform gain switching based on an actual component capability. This is not limited in this application.

It should also be noted that gain switching may also occur in uplink forwarding gain information indicated by using same signaling. For example, in the foregoing FIG. 5A, the first time domain resource indicates the uplink forwarding gain corresponding to the PRACH as A by the semi-static signaling, and the second time domain resource indicates the uplink forwarding gain corresponding to the SRS as B by the semi-static signaling. It is assumed that a priority of the PRACH is higher than that of the SRS. In this case, the relay device may perform the gain switching operation on the symbol 0 and the symbol 1 of the second time domain resource. For example, in the foregoing FIG. 5A, the first time domain resource indicates the uplink forwarding gain corresponding to the PUCCH as A by the dynamic signaling, and the second time domain resource indicates the uplink forwarding gain corresponding to the SRS as B by the dynamic signaling. It is assumed that a priority of the SRS is higher than that of the PUCCH. In this case, the relay device may perform the gain switching operation on the symbol 0 and the symbol 1 of the second time domain resource. In addition, a priority order of the uplink forwarding gains indicated by the semi-static signaling or a priority order of the uplink forwarding gains indicated by the dynamic signaling is not limited herein. The donor base station and the relay device may agree on a priority of a forwarding gain corresponding to each piece of resource information through a protocol.

In an optional implementation, this application may further define that no gain switching operation is performed on consecutive time domain resources. For example, when the consecutive time domain resources have different uplink forwarding gains, the relay device performs the uplink forwarding operation based on an uplink forwarding gain of a highest priority. In other words, an uplink forwarding gain corresponding to the first time domain resource is a gain 1, an uplink forwarding gain corresponding to the second time domain resource is a gain 2, and when a priority of forwarding gain configuration information corresponding to the gain 2 is higher than a priority of forwarding gain configuration information corresponding to the gain 1, the relay device performs uplink forwarding on the received signal based on the gain 2 on both the first time domain resource and the second time domain resource. In addition, to avoid a case of gain switching, the protocol may specify that the donor base station does not indicate different uplink forwarding gains on consecutive time domain resources.

It should be noted that the relay device may perform gain adjustment of an uplink circuit on resource information for not performing the uplink forwarding operation, where the resource information for not performing the uplink forwarding operation includes: a downlink forwarding resource, a silence resource, a guard interval, or the like. The downlink forwarding resource is a resource used by the relay device to perform downlink forwarding, the silent resource is a resource used by the relay device not to perform uplink forwarding and downlink forwarding, and the guard interval is an interval at which the relay device performs uplink-downlink forwarding switching. The relay device performs gain adjustment on a resource on which uplink forwarding is not performed, which can avoid damage to uplink signal quality caused by gain adjustment.

The foregoing describes how the donor base station configures the uplink forwarding gain related to the resource information for the relay device, and the relay device performs the uplink forwarding operation based on the uplink forwarding gain corresponding to current resource information. However, how the donor base station determines the uplink forwarding gains corresponding to different resource information is not described above. How the donor base station configures the uplink forwarding gain is described below. It should be noted that performance of uplink amplified noise is an important reference factor for determining the uplink forwarding gain by the donor base station, and different uplink forwarding gains may be adaptively configured by the donor base station for amplified noise on different resource information.

In an optional implementation, the relay device may report power information of amplified noise to the donor base station. Optionally, the relay device may further measure an amplified noise power on a resource indicated by the donor base station, and report the measured amplified noise power to the donor base station. The specified resource includes one or more of the following: a time domain resource, a frequency domain resource, and an access beam. For example, the donor base station indicates the relay device to measure the amplified noise power on a time domain resource 1, to obtain a measurement result, and feed back the measurement result to the donor base station. This is merely an example for description, and is not limited herein.

It should be noted that the relay device may report amplified noise power information or effective isotropic radiated power (EIRP) information of amplified noise, where the amplified noise power information includes a backhaul array gain of the relay device, but the EIRP information does not include the backhaul array gain of the relay device. The amplified noise information (a power or an EIRP) reported by the relay device may be amplified noise information of all bandwidths, or may be amplified noise information of a part of bandwidths, for example, a component carrier (CC), a resource block (RB), a resource element (RE), or the like.

In addition, the amplified noise information reported by the relay device may be an absolute power value (unit: dBm), or may be a relative power value (unit: dB). When reporting the relative power value, a reference power value needs to be considered. For example, the reference power value may be a sending power of a relay device control link, or may be a theoretical thermal noise power value.

It should also be noted that the relay device needs to report the amplified noise power information based on a specified uplink amplification gain (the gain is used as the reference gain for description below). Information about the reference gain may be specified in a communication protocol, or may be directly indicated by the donor base station. This is not limited in this application. Optionally, to make the uplink forwarding gain information configured by the donor base station more accurate, the relay device may report a plurality of pieces of reference gain-based amplified noise power information.

In an implementation, the noise power information reported by the relay device is based on a specific access beam. In other words, the donor base station may indicate the relay device to report amplified noise power information based on one or more access beams.

In an implementation, the relay device may further directly report a noise figure (noise figure) of an uplink forwarding channel to the donor base station, and the donor base station may determine the amplified noise power based on the noise figure.

In an implementation, the relay device may further directly report an unamplified noise power, and then the donor base station determines the amplified noise power based on the unamplified noise power and the uplink forwarding gain. A method of reporting the unamplified noise power is similar to that of reporting the amplified noise power, including whether to consider a backhaul array gain, a reporting bandwidth, and reporting an absolute power value or a relative power value.

After obtaining the amplified noise power information of the relay device, the donor base station may configure the uplink forwarding gain of the relay device more properly, to obtain better uplink forwarding performance.

In addition, the relay device may further report uplink amplification capability information thereof to the donor base station. For example, the uplink amplification capability information includes maximum gain information for uplink amplification performed by the relay device. In an implementation, the uplink amplification capability information is bound to the backhaul beam information or the access beam information, that is, the relay device reports uplink amplification capability information or maximum gain information that is associated with different backhaul beam information or access beam information. For example, as shown in Table 8, a maximum uplink forwarding gain that is supported by a backhaul beam 1 and is reported by the relay device is A3; and a maximum uplink forwarding gain that is supported by a backhaul beam 2 and is reported by the relay device is B3. This is merely an example description herein, and is not illustrated one by one.

TABLE 8

| Backhaul beam information | Maximum uplink forwarding gain |
| --- | --- |
| Backhaul beam 1 | A gain value is A3. |
| Backhaul beam 2 | A gain value is B3. |
| Backhaul beam 3 | A gain value is C3. |
| . . . | . . . |

As shown in Table 9, a maximum uplink forwarding gain that is supported by an access beam 1 and is reported by the relay device is A4; and a maximum uplink forwarding gain that is supported by an access beam 2 and is reported by the relay device is B4. This is merely an example description herein, and is not illustrated one by one.

TABLE 9

| Access beam information | Maximum uplink forwarding gain |
|---|---|
| Access beam 1 | A gain value is A4. |
| Access beam 2 | A gain value is B4. |
| Access beam 3 | A gain value is C4. |
| . . . | . . . |

In another implementation, the relay device may further report uplink amplification capability information or maximum gain information associated with different combinations of backhaul beams and access beams. For example, a maximum gain of the relay device in a combination of {backhaul beam information X, access beam Y} is A5.

It should be noted that after the relay device reports the uplink amplification capability information, the donor base station may configure different uplink forwarding gain information based on the uplink amplification capability of the relay device with reference to the resource information. The donor base station configures the uplink forwarding gain information with reference to the uplink amplification capability information of the relay device, to better adapt to a device parameter of the relay device.

Figure 6:
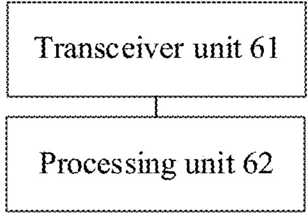
FIG. 6 is a diagram of a relay device according to an embodiment of this application.

Based on a same concept, an embodiment of this application provides a relay device, as shown in FIG. 6, including a transceiver unit 61 and a processing unit 62. In actual application, the transceiver unit may include a receiving unit and a sending unit. The receiving unit may be configured to implement a sending function in a method embodiment, the receiving unit may be configured to implement a receiving function in the method embodiment, and another function in the method embodiment may be implemented by the processing unit. For example, the receiving unit may be configured to receive forwarding gain configuration information, and the sending unit may send a signal (for example, an uplink signal from a terminal device and/or a noise signal) forwarded by the relay device to a donor base station. The receiving unit may be implemented by using an output interface in a data processing chip, and the sending unit may be implemented by using an input interface of the data processing chip. This is not limited in this application.

The processing unit 62 is configured to determine a first forwarding gain corresponding to first resource information based on an association relationship between a forwarding gain and resource information. The resource information includes one or more of the following: signal information, channel information, a time domain resource number, backhaul beam information, and access beam information. The transceiver unit 61 is configured to forward a received signal on a first time domain resource by using the first forwarding gain, where the first time domain resource is determined based on the first resource information.

In this embodiment of this application, the relay device performs a forwarding operation based on uplink forwarding gains corresponding to different resource information configurations, and a coverage enhancement capability of the relay device can be improved. For example, when scheduling a near-end user, the donor base station indicates the relay device to perform forwarding by using a low forwarding gain, to avoid interference caused by amplified noise. When receiving a common channel (for example, a PRACH), the donor base station indicates the relay device to perform forwarding by using a moderate forwarding gain, thereby balancing access success rates of a directly connected user and a non-directly connected user.

In an optional implementation, the transceiver unit 61 is further configured to: receive forwarding gain configuration information from the donor base station. The forwarding gain configuration information includes the association relationship between the forwarding gain and the resource information.

In an optional implementation, different resource information corresponds to different forwarding gains.

In this application, relationships between different resource information and forwarding gains are configured to indicate the relay device to perform a forwarding operation, so that forwarding performance of the relay device can be improved.

In an optional implementation, the forwarding gain is an absolute gain or an offset relative to a reference gain. The reference gain is one of the following information: a downlink forwarding gain or a preset gain.

It should be noted that if being an absolute gain value, the forwarding gain may be a gain value of an amplification circuit. For example, the uplink forwarding gain information is 10 dB, that is, the gain value of the amplification circuit is 10 dB. If being a relative gain value, the forwarding gain may be an offset value (unit: decibel dB or linear multiple) relative to a reference gain. For example, if an uplink forwarding gain is 5 dB and the reference gain is 30 dB, an actual uplink forwarding gain is 35 dB. If the uplink forwarding gain is a relative gain value, the reference gain may be configured based on the downlink forwarding gain. For example, if the downlink forwarding gain is 20 dB, the reference gain may be set to 20 dB. Alternatively, the reference gain may be set based on a value predefined by the donor base station. For example, if the predefined value is 30 dB, the reference gain is set to 30 dB.

In an optional implementation, the forwarding gain configuration information is indicated by semi-static signaling.

It should be noted that the forwarding gain configuration information indicated by the donor base station by the semi-static signaling may be stored in a memory of the relay device. The semi-static signaling may be RRC signaling, or may be another signaling. This is not limited in this application.

In an optional implementation, the forwarding gain configuration information is indicated by dynamic signaling.

It should be noted that the dynamic signaling is more flexible, and can flexibly indicate forwarding gains of different resource information configurations, for example, indicate forwarding gains corresponding to all resource information by using DCI or a MAC CE, indicate a forwarding gain of a time domain resource, or the like. This is not limited in this application.

In addition, the semi-static signaling may indicate a forwarding gain corresponding to a signal or a channel, and the dynamic signaling may indicate a forwarding gain corresponding to resource information other than the signal or the channel. For example, that an uplink forwarding gain corresponding to a PRACH is X is indicated by the RRC signaling, and that a forwarding gain corresponding to a time domain resource 1 (for example, a slot 3, or a slot 3 to a slot 10) is Y is indicated by using the DCI. The semi-static signaling and the dynamic signaling indicate an uplink forwarding gain corresponding to which resource information is merely described as an example, and is not limited herein.

In an optional implementation, priorities of forwarding gains corresponding to different resource information are different, and a priority of a forwarding gain corresponding to the channel information is higher than a priority of a forwarding gain corresponding to the signal information. For example, a priority of a forwarding gain corresponding to a PRACH is higher than a priority of a forwarding gain corresponding to an SRS.

In an optional implementation, the forwarding gain configuration information includes: first gain configuration information and second gain configuration information. The first gain configuration information is indicated by the semi-static signaling, the second gain configuration information is indicated by the dynamic signaling, and a priority of the first gain configuration information is higher than a priority of the second gain configuration information.

In this embodiment of this application, a priority of forwarding gain information indicated by the semi-static signaling is configured to be higher than a priority of forwarding gain information indicated by the dynamic signaling, so that accurate forwarding of a semi-static signal can be ensured. It should be noted that generally, forwarding of the semi-static signal is more important, and quality thereof needs to be ensured during uplink forwarding. Therefore, the priority of the forwarding gain information indicated by the semi-static signaling is higher than the priority of the forwarding gain information indicated by the dynamic signaling.

In an optional implementation, the first forwarding gain includes a first gain value and a second gain value; the first gain value is different from the second gain value; the first gain value is determined based on the first gain configuration information; and the second gain value is determined based on the second gain configuration information; and the transceiver unit 61 is configured to: forward the received signal on the first time domain resource by using the first gain value.

In an optional implementation, the processing unit 62 is further configured to: switch forwarding gains in first one or more time units of a second time domain resource if the first forwarding gain is determined based on the first gain configuration information, and a second forwarding gain is determined based on the second gain configuration information; or switch forwarding gains in last one or more time units of the first time domain resource if the first forwarding gain is determined based on the second gain configuration information, and a second forwarding gain is determined based on the first gain configuration information. The second forwarding gain is a forwarding gain used by the relay device to forward the received signal on the second time domain resource; and the first time domain resource and the second time domain resource are adjacent time domain resources, and the second forwarding gain is different from the first forwarding gain.

It should be noted that the foregoing time units are consecutive time units, and the time units may be subframes, symbols, or the like. This is not limited in this application. For example, the first time domain resource includes a plurality of time units. It is assumed that the time units are symbols, and the first time domain resource includes 14 symbols (0 to 13). When the forwarding gains are switched, switching of the forwarding gains are performed on symbol 11 to symbol 13 (the symbol 11 to symbol 13 may be understood as last one or more time units) of the first time domain resource. The second time domain resource includes a plurality of time units. It is assumed that the time units are symbols, and the second time domain resource includes 14 symbols (0 to 13). When the forwarding gains are switched, switching of the forwarding gains are performed on symbol 1 to symbol 3 (the symbol 1 to symbol 3 may be understood as first one or more time units) of the second time domain resource. This application is merely an example for description herein, and is not limited.

In an optional implementation, the transceiver unit 61 is further configured to report amplified noise power information to the donor base station, so that the donor base station determines the forwarding gain configuration information based on the amplified noise power information.

In an optional implementation, the transceiver unit 61 is further configured to receive indication information from the donor base station. The indication information indicates the relay device to measure the amplified noise power information on a specified resource; and the specified resource includes one or more of the following: a time domain resource, a frequency domain resource, and an access beam. The processing unit 62 is further configured to measure the amplified noise power information on the specified resource.

Figure 7:
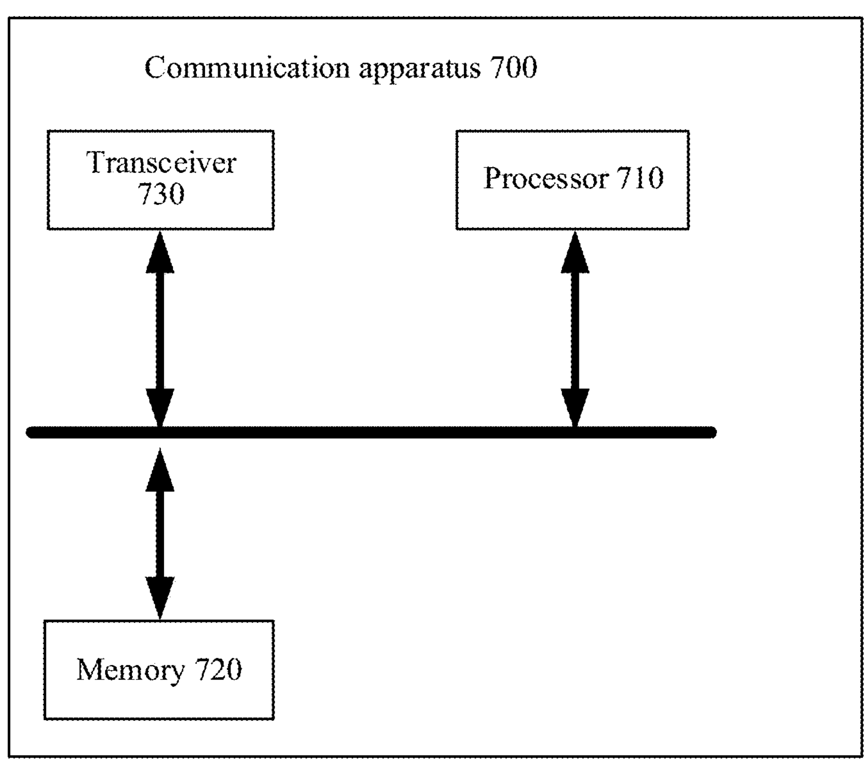
FIG. 7 is a diagram of a communication device according to an embodiment of this application.

Based on a same concept, FIG. 7 shows a communication apparatus 700 according to this application. For example, the communication apparatus 700 may be a chip or a chip system. Optionally, in this embodiment of this application, the chip system may include a chip, or may include a chip and another discrete component. When the communication apparatus is implemented by using a chip, an input port of the chip may be used as a receiver, and an output port of the chip may be used as a transmitter.

The communication apparatus 700 may include at least one processor 710, and the communication apparatus 700 may further include at least one memory 720, configured to store a computer program, program instructions, and/or data. The memory 720 is coupled to the processor 710. The coupling in this embodiment of this application may be an indirect coupling or a communication connection between apparatuses, units, or modules in an electrical form, a mechanical form, or another form, and is used for information exchange between the apparatuses, the units, or the modules. The processor 710 may cooperate with the memory 720. The processor 710 may execute a computer program stored in the memory 720. Optionally, the at least one memory 720 may be integrated into the processor 710.

The communication apparatus 700 may further include a transceiver 730, and the communication apparatus 700 may exchange information with another device by using the transceiver 730. The transceiver 730 may be a circuit, a bus, a transceiver, or any other apparatus that may be configured to perform communication. The transceiver 730 may include a receiver and a transmitter. The receiver may be configured to implement a receiving function in a method embodiment, the sending unit may be configured to implement a sending function in the method embodiment, and another function in the method embodiment may be implemented by using the processor.

In an implementation, the communication apparatus 700 may be applied to the foregoing terminal device, may be the foregoing relay device, or may be the foregoing donor base station. The memory 720 stores a necessary computer program, program instructions, and/or data for implementing a function of the relay device in any one of the foregoing embodiments. The processor 710 may execute the computer program stored in the memory 720, to complete the method in any one of the foregoing embodiments.

A connection medium between the transceiver 730, the processor 710, and the memory 720 is not limited in this embodiment of this application. In this embodiment of this application, in FIG. 7, the memory 720, the processor 710, and the transceiver 730 are connected through a bus. The bus is represented by a thick line in FIG. 7. A connection manner between other components is merely an example for description, and is not limited thereto. The bus may be classified into an address bus, a data bus, a control bus, and the like. For ease of representation, only one bold line is used to represent the bus in FIG. 7, but this does not mean that there is only one bus or only one type of bus. In this embodiment of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general-purpose processor may be a microprocessor, any conventional processor, or the like. The steps of the method disclosed with reference to embodiments of this application may be directly performed by a hardware processor, or may be performed by using a combination of hardware and software modules in the processor.

In embodiments of this application, the memory may be a nonvolatile memory, a hard disk drive (HDD) or a solid-state drive (SSD), or may be a volatile memory, for example, a random access memory (RAM). The memory may be any other medium that can be configured to carry or store desired program code in a form of an instruction or a data structure and that can be accessed by a computer, but is not limited thereto. Alternatively, the memory in this embodiment of this application may be a circuit or any other apparatus that can implement a storage function, and is configured to store a computer program, program instructions, and/or data.

An embodiment of this application further provides a communication system, including a donor base station and a relay device. The donor base station is configured to determine forwarding gain configuration information, and send the forwarding gain configuration information to the relay device, where the forwarding gain configuration information includes an association relationship between a forwarding gain and resource information. The relay device is configured to determine a first forwarding gain corresponding to first resource information based on the association relationship between the forwarding gain and the resource information, where the resource information includes one or more of the following: signal information, channel information, a time domain resource number, backhaul beam information, and access beam information; and forward a received signal on a first time domain resource by using the first forwarding gain, where the first time domain resource is determined based on the first resource information.

Based on the foregoing embodiments, an embodiment of this application further provides a readable storage medium. The readable storage medium stores instructions. When the instructions are executed, the signal forwarding method in any one of the foregoing embodiments is implemented. The readable storage medium may include: any medium that can store program code, such as a USB flash drive, a removable hard disk, a read-only memory, a random access memory, a magnetic disk, or an optical disc.

A person skilled in the art should understand that embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the apparatus (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing apparatus to generate a machine, so that the instructions executed by a computer or the processor of another programmable data processing apparatus generate an apparatus for implementing a specified function in one or more procedures in the flowcharts and/or in one or more blocks in the block diagrams.

These computer program instructions may also be stored in a computer-readable memory that can instruct a computer or another programmable data processing apparatus to work in a specific manner, so that the instructions stored in the computer-readable memory generate an artifact that includes an instruction apparatus. The instruction apparatus implements a specified function in one or more procedures in the flowcharts and/or in one or more blocks in the block diagrams.

These computer program instructions may also be loaded onto a computer or another programmable data processing apparatus, so that a series of operation steps are performed on the computer or another programmable apparatus, thereby generating computer-implemented processing. Therefore, the instructions executed on the computer or another programmable apparatus provide steps for implementing a specified function in one or more procedures in the flowcharts and/or in one or more blocks in the block diagrams.

What is claimed is:

1. A signal forwarding method applied to a relay device, the signal forwarding method comprising:

determining a first forwarding gain corresponding to first resource information, based on an association relationship between a forwarding gain and resource information, the resource information comprising one or more of: signal information, channel information, a time domain resource number, backhaul beam information, or access beam information; and forwarding a received signal on a first time domain resource using the first forwarding gain, the first time domain resource being determined based on the first resource information.

2. The method according to claim 1, further comprising:

receiving forwarding gain configuration information from a donor base station, wherein the forwarding gain configuration information comprises the association relationship between the forwarding gain and the resource information.

3. The method according to claim 2, wherein the forwarding gain configuration information is indicated by semi-static signaling, or the forwarding gain configuration information is indicated by dynamic signaling.

4. The method according to claim 2, wherein the forwarding gain configuration information comprises: first gain configuration information and second gain configuration information, wherein the first gain configuration information is indicated by semi-static signaling, the second gain configuration information is indicated by dynamic signaling, and a first gain priority of the first gain configuration information is higher than a second gain priority of the second gain configuration information.

5. The method according to claim 4, wherein the first forwarding gain comprises a first gain value and a second gain value, the first gain value is different from the second gain value, the first gain value is determined based on the first gain configuration information, the second gain value is determined based on the second gain configuration information, and the forwarding the received signal on the first time domain resource using the first forwarding gain comprises:

forwarding the received signal on the first time domain resource using the first gain value.

6. The method according to claim 4, wherein the method further comprises:

switching forwarding gains in a first time unit or first time units of a second time domain resource if the first forwarding gain is determined based on the first gain configuration information, and a second forwarding gain is determined based on the second gain configuration information; or switching forwarding gains in a last time unit or last time units of the first time domain resource if the first forwarding gain is determined based on the second gain configuration information, and a second forwarding gain is determined based on the first gain configuration information;

wherein the second forwarding gain is used by the relay device to forward the received signal on the second time domain resource, the first time domain resource and the second time domain resource are adjacent time domain resources, and the second forwarding gain is different from the first forwarding gain.

7. The method according to claim 2, further comprising:

reporting amplified noise power information to the donor base station for determining the forwarding gain configuration information based on the amplified noise power information.

8. The method according to claim 7, further comprising:

receiving indication information from the donor base station, the indication information indicating the relay device measure the amplified noise power information on a specified resource, the specified resource comprising one or more of: a time domain resource, a frequency domain resource, or an access beam; and measuring the amplified noise power information on the specified resource.

9. The method according to claim 1, wherein priorities of forwarding gains corresponding to different resource information are different, and a channel priority of a forwarding gain corresponding to the channel information is higher than a signal priority of a forwarding gain corresponding to the signal information.

10. A relay device, comprising:

a processor configured to determine a first forwarding gain corresponding to first resource information based on an association relationship between a forwarding gain and resource information, the resource information comprising one or more of: signal information, channel information, a time domain resource number, backhaul beam information, or access beam information; and a transceiver configured to forward a received signal on a first time domain resource using the first forwarding gain, the first time domain resource being determined based on the first resource information.

11. The device according to claim 10, wherein the transceiver is further configured to:

receive forwarding gain configuration information from a donor base station, wherein the forwarding gain configuration information comprises the association relationship between the forwarding gain and the resource information.

12. The device according to claim 11, wherein the forwarding gain configuration information is indicated by semi-static signaling, or the forwarding gain configuration information is indicated by dynamic signaling.

13. The device according to claim 11, wherein the forwarding gain configuration information comprises: first gain configuration information and second gain configuration information, wherein the first gain configuration information is indicated by semi-static signaling, the second gain configuration information is indicated by dynamic signaling, and a first gain priority of the first gain configuration information is higher than a second gain priority of the second gain configuration information.

14. The device according to claim 13, wherein the first forwarding gain comprises a first gain value and a second gain value, the first gain value is different from the second gain value, the first gain value is determined based on the first gain configuration information, the second gain value is determined based on the second gain configuration information, and the transceiver is configured to:

forward the received signal on the first time domain resource using the first gain value.

15. The device according to claim 13, wherein the processor is further configured to:

switch forwarding gains in a first time unit or first time units of a second time domain resource if the first forwarding gain is determined based on the first gain configuration information, and a second forwarding gain is determined based on the second gain configuration information; or switch forwarding gains in a last time unit or last time units of the first time domain resource if the first forwarding gain is determined based on the second gain configuration information, and a second forwarding gain is determined based on the first gain configuration information;

wherein the second forwarding gain is used by the relay device to forward the received signal on the second time domain resource, the first time domain resource and the second time domain resource are adjacent time domain resources, and the second forwarding gain is different from the first forwarding gain.

16. The device according to claim 11, wherein the transceiver is further configured to:

report amplified noise power information to the donor base station for determining the forwarding gain configuration information based on the amplified noise power information.

17. The device according to claim 16, wherein the transceiver is further configured to:

receive indication information from the donor base station, the indication information indicating the relay device measure the amplified noise power information on a specified resource, the specified resource comprising one or more of: a time domain resource, a frequency domain resource, or an access beam; and the processor is further configured to measure the amplified noise power information on the specified resource.

18. The device according to claim 10, wherein priorities of forwarding gains corresponding to different resource information are different, and a channel priority of a forwarding gain corresponding to the channel information is higher than a signal priority of a forwarding gain corresponding to the signal information.

19. A non-transitory computer-readable storage medium storing computer instructions, that configure at least one processor, upon execution of the instructions, to perform the following steps:

determining a first forwarding gain corresponding to first resource information and based on an association relationship between a forwarding gain and resource information, the resource information comprising one or more of: signal information, channel information, a time domain resource number, backhaul beam information, or access beam information; and forwarding a received signal on a first time domain resource by using the first forwarding gain, wherein the first time domain resource is determined based on the first resource information.

20. The non-transitory computer-readable storage medium according to claim 19, the steps further comprising:

receiving forwarding gain configuration information from a donor base station, wherein the forwarding gain configuration information comprises the association relationship between the forwarding gain and the resource information.

* * * * *